(12) United States Patent
Lee et al.

(10) Patent No.: US 8,074,969 B2
(45) Date of Patent: Dec. 13, 2011

(54) RECONFIGURABLE GATE

(75) Inventors: Melody Lee, Markham (CA); Kevin Xin, Toronto (CA); Lawrence Chun Hei Chu, Shenzhen (CN)

(73) Assignee: Merry Products Corporation, Markham, Ontario (CA)

( * ) Notice: Subject to any disclaimer, the term of this patent is extended or adjusted under 35 U.S.C. 154(b) by 243 days.

(21) Appl. No.: 12/497,061

(22) Filed: Jul. 2, 2009

(65) Prior Publication Data

US 2011/0001106 A1 Jan. 6, 2011

(51) Int. Cl.
*E04H 17/18* (2006.01)

(52) U.S. Cl. ............... 256/73; 256/26; 256/60; 49/158; 49/465; 119/514

(58) Field of Classification Search .............. 256/26, 256/27, 60, 65.01, 65.15, 73, 31, 64; 49/55, 49/57, 124, 130, 158, 465; 119/513, 514, 119/474, 484; 160/135
See application file for complete search history.

(56) References Cited

U.S. PATENT DOCUMENTS

| | | | | | |
|---|---|---|---|---|---|
| 170,714 | A | * | 12/1875 | Couch | 256/27 |
| 192,709 | A | * | 7/1877 | McAllister | 256/27 |
| 915,131 | A | * | 3/1909 | Villard | 256/25 |
| 1,009,378 | A | * | 11/1911 | Boardman | 256/25 |
| 1,198,475 | A | * | 9/1916 | O'Gorman | 256/25 |
| 2,603,456 | A | * | 7/1952 | Ruopp | 256/60 |
| 2,744,729 | A | * | 5/1956 | Potts | 256/59 |
| 3,265,364 | A | * | 8/1966 | Frye | 256/19 |
| 3,970,045 | A | * | 7/1976 | Graham, Jr. | 119/514 |
| 4,537,151 | A | * | 8/1985 | Bolton | 119/512 |
| 4,733,851 | A | * | 3/1988 | Weiss | 256/60 |
| 5,461,827 | A | * | 10/1995 | Lofton | 49/55 |
| 6,553,940 | B1 | * | 4/2003 | Powell et al. | 119/514 |
| 6,729,267 | B2 | * | 5/2004 | Campbell | 119/513 |
| 7,568,449 | B2 | * | 8/2009 | Hirokawa et al. | 119/452 |
| D630,803 | S | * | 1/2011 | Lee et al. | D30/199 |
| 2007/0210293 | A1 | * | 9/2007 | Cheng | 256/26 |
| 2009/0090898 | A1 | * | 4/2009 | Orriere | 256/73 |

* cited by examiner

*Primary Examiner* — Joshua Kennedy
(74) *Attorney, Agent, or Firm* — Harness, Dickey & Pierce, P.L.C.

(57) ABSTRACT

A reconfigurable gate includes a first fence section, a section fence section and third fence section. The first fence section includes a plurality of first cross members. The second fence section includes a plurality of second cross members. The third fence section includes a plurality of third cross members. The first fence section and the second fence section are rotatably attached to the third fence section such that when the gate or fence is in a fully collapsed configuration, the plurality of first cross members and the plurality of second cross members are substantially interleaved with the plurality of third cross members.

20 Claims, 4 Drawing Sheets

RECONFIGURABLE GATE

Pet owners frequently employ fences or gates to contain their pets. Parents often desire to protect children by limiting their range. Home owners in general have various reasons for keeping things behind fences and gates.

While known fences and gates may have proven suitable for their intended purposes, a need for improvement in the art remains.

In accordance with one particular aspect, the present teachings provide a gate that is reconfigurable. The reconfigurable gate includes a first fence section, a second fence section and third fence section. The first fence section includes a plurality of first cross members. The second fence section includes a plurality of second cross members. The third fence section includes a plurality of third cross members. The first fence section and the second fence section are rotatably attached to the third fence section such that when the gate or fence is in a fully collapsed configuration, the plurality of first cross members and the plurality of second cross members are substantially interleaved with the plurality of third cross members In accordance with another particular aspect, the present teachings provide a gate that is portable. The portable gate includes a first fence section, a second fence section and a third fence section. The first fence section includes a first support member. The second fence section includes a second support member. The third fence section includes at least a third support member. The first fence section and second fence section are rotatable relative to the third fence section between a collapsed configuration and an expanded configuration. In the collapsed configuration the first, second and third fence section cooperate to define a substantially planar wall.

In accordance with a further particular aspect, the present teachings provide a gate that is reconfigurable. The reconfigurable gate includes a generally planar central section, a first end section and a second end section. The central section defines first and second pluralities of horizontally extending openings. The first end section is defined by a first plurality of horizontally extending elements. The second end section is defined by a second plurality of horizontally extending elements. The first end section and second end section are coupled to the central section for rotation about first and second pivot axes, respectively. The first and second end sections are each rotatable relative to the central section between a collapsed configuration and an expanded configuration. In the collapsed configuration, the first plurality of horizontally extending elements is substantially disposed in the first plurality of openings and the second plurality of horizontally extending elements is substantially disposed in the second plurality of openings.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DESCRIPTION OF VARIOUS ASPECTS

Figure 1:
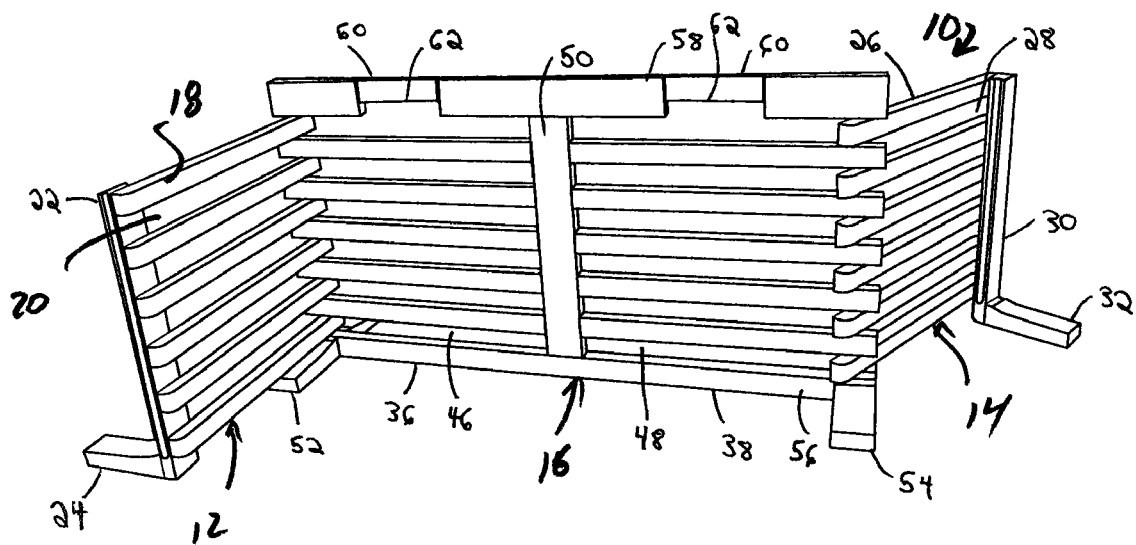
FIG. 1 is a perspective view of a reconfigurable gate in accordance with the present teachings, the reconfigurable gate shown in an expanded condition.

The following description is merely exemplary in nature and is not intended to limit the present teachings, application, or uses. It should be understood that throughout the drawings, corresponding reference numerals indicate like or corresponding parts and features. Although the following description relates generally to an apparatus for use in confining a pet to a defined area, it will be understood that the apparatus as described and claimed herein, can be used in any manner where it is desired to partition a space or area. Therefore, it will be understood that the following discussions are not intended to limit the scope of the present teachings and claims herein.

With general reference to FIGS. 1-6, a reconfigurable fence or gate in accordance with the present teachings is illustrated and generally identified at reference character 10. As will be appreciated more fully below, the reconfigurable gate 10 may be oriented in various configurations for use within distinct environments. In one particular configuration, the reconfigurable gate 10 is collapsed and generally planar.

The reconfigurable gate 10 may generally include a first section 12, a second section 14 and a third section 16. The third section 16 may be a central section. The first and second sections 12, 14 may be coupled to the third section 16 for articulation.

Figure 2:
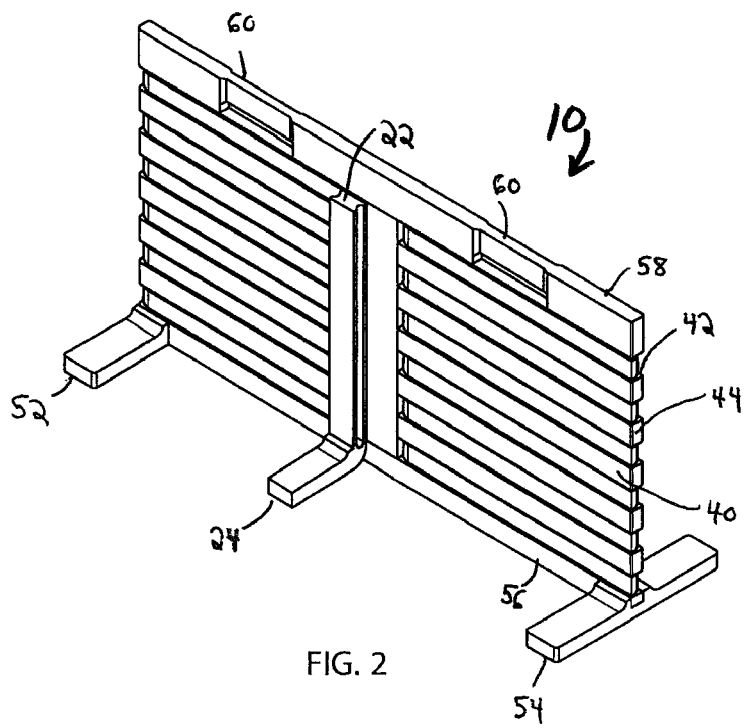
FIG. 2 is another perspective view of the reconfigurable gate of the present teachings, the reconfigurable gate shown in a collapsed condition.

With general reference to FIGS. 1-6, the first section 12 may include a plurality of horizontal first cross members 18 that define a plurality of horizontal first openings 20. The first section 12 may further include a first vertical support member 22 and a first horizontal support member or foot 24. The first vertical support member 22 may be fastened to the plurality of horizontal first cross members 18 and the first horizontal support member 24 may be fastened to the first vertical support member 22 by any manner well known in the art, including but not limited to screws, nails, bolts and glue. It will also be appreciate by those skilled in the art that the first horizontal support member 24 may be formed integrally with the first vertical support member or may be fastened to the horizontal first cross member(s) 18. As shown in FIGS. 1 and 2, the first vertical support member 22 and first horizontal support member 24 may be operable to support the first section 12 in an open configuration and provide additional support to the reconfigurable gate 10 in the closed configuration.

The second section 14 may be generally identical to the first section 12. In this regard, the second section 14 may include a plurality of horizontal second cross members 26 that define a plurality of horizontal second openings 28. The second section 14 may further include a second vertical support member 30 and a second horizontal support member or foot 32. The second vertical support member 30 may be fastened to the plurality of horizontal second cross members 26 and the second horizontal support member 32 may be fastened to the second vertical support member 30 by any manner well known in the art, including but not limited to screws, nails, bolts and glue. It will also be appreciate by those skilled in the art that the second horizontal support member 32 may be formed integrally with the second vertical support member 30 or may be fastened to the horizontal second cross member(s) 26. As shown in FIGS. 1 and 2, the second vertical support member 30 and second horizontal support member 32 may be operable to support the second section 14 in an open configuration and provide additional support to the reconfigurable gate 10 in the closed configuration.

The third section 16 may include third cross members 34 that may be organized into a first plurality of third cross members 36 and a second plurality of third cross members 38. The cross members of the first and second plurality of third cross members 36, 38 each include a first side wall 40, a second side wall 42, and an end wall 44. As best seen in FIG. 2, the first side wall 40, second side wall 42, and end wall 44 form an outermost border of the reconfigurable gate 10 in the collapsed configuration. The first and second plurality of third cross members 36, 38 may generally define a first and second plurality of openings 46, 48, respectively. The first and second plurality of third cross members 36, 38 and first and second plurality of opening 46, 48 may extend horizontally.

The third section 16 may further include a vertical stanchion 50 that separates the first plurality of openings 46 and first plurality of third cross members 36 from the second plurality of openings 48 and second plurality of third cross members 38. The vertical stanchion 50 may further provide support to the third section 16 when the reconfigurable gate 10 is in an upright configuration.

The third section may also include a third support member 52 and a fourth support member 54 operable to make the reconfigurable gate 10 self-supporting. The third and fourth support members 52, 54 may be fastened to a bottom third cross member 56 by any manner well known in the art, including but not limited to screws, nails, bolts and glue. Further, the third and fourth support members 52, 54 may be integrally formed with the bottom third cross member 56.

Figure 3:
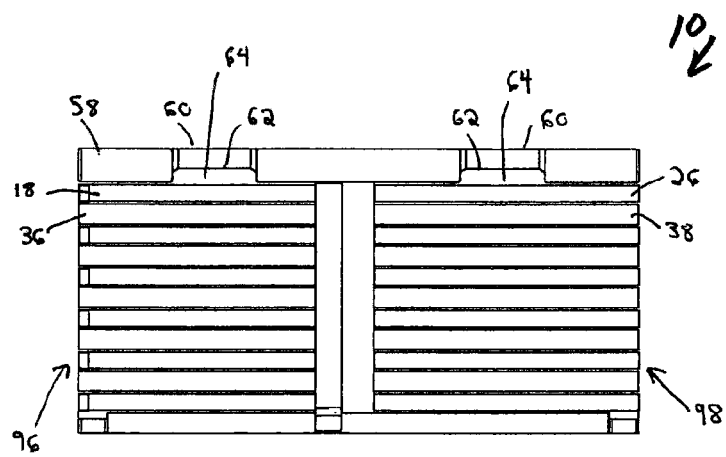
FIG. 3 is a front view of the reconfigurable gate of the present teachings, the reconfigurable gate shown in a collapsed condition.
Figure 4:
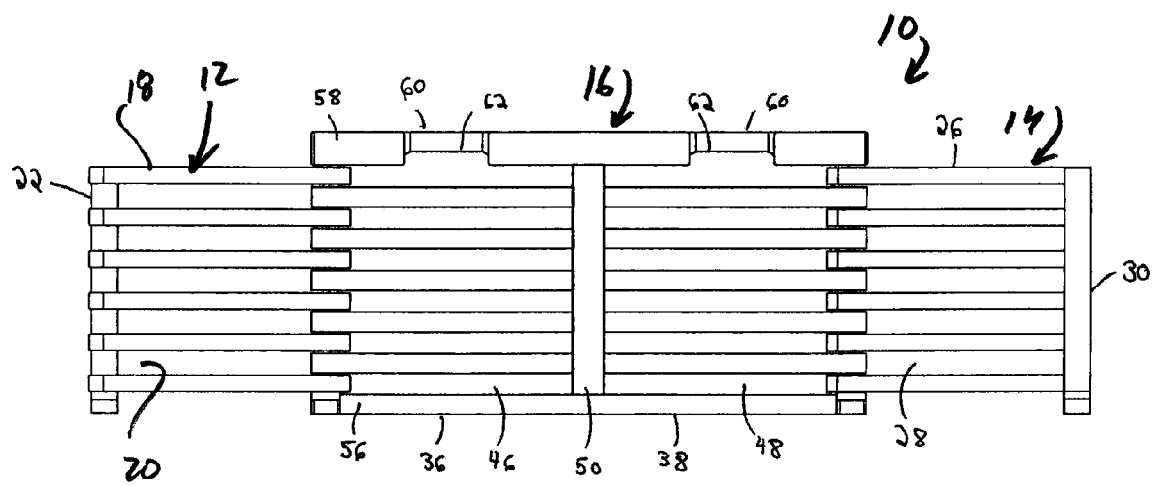
FIG. 4 is a front view of the reconfigurable gate of the present teachings, the reconfigurable gate shown in an expanded condition.

A top third cross member 58 may include at least one handle section 60 defined by at least one reduced height portion 62. With particular reference to FIG. 3, the reduced height portion(s) 62 may form at least one aperture 64 in the reconfigurable gate 10 in the collapsed configuration. It will be appreciated by those skilled in the art that the handle section(s) 60 may be defined in any of the third cross members 34. The handle sections 60 are operable to make the reconfigurable gate 10 easily portable.

Figure 5:
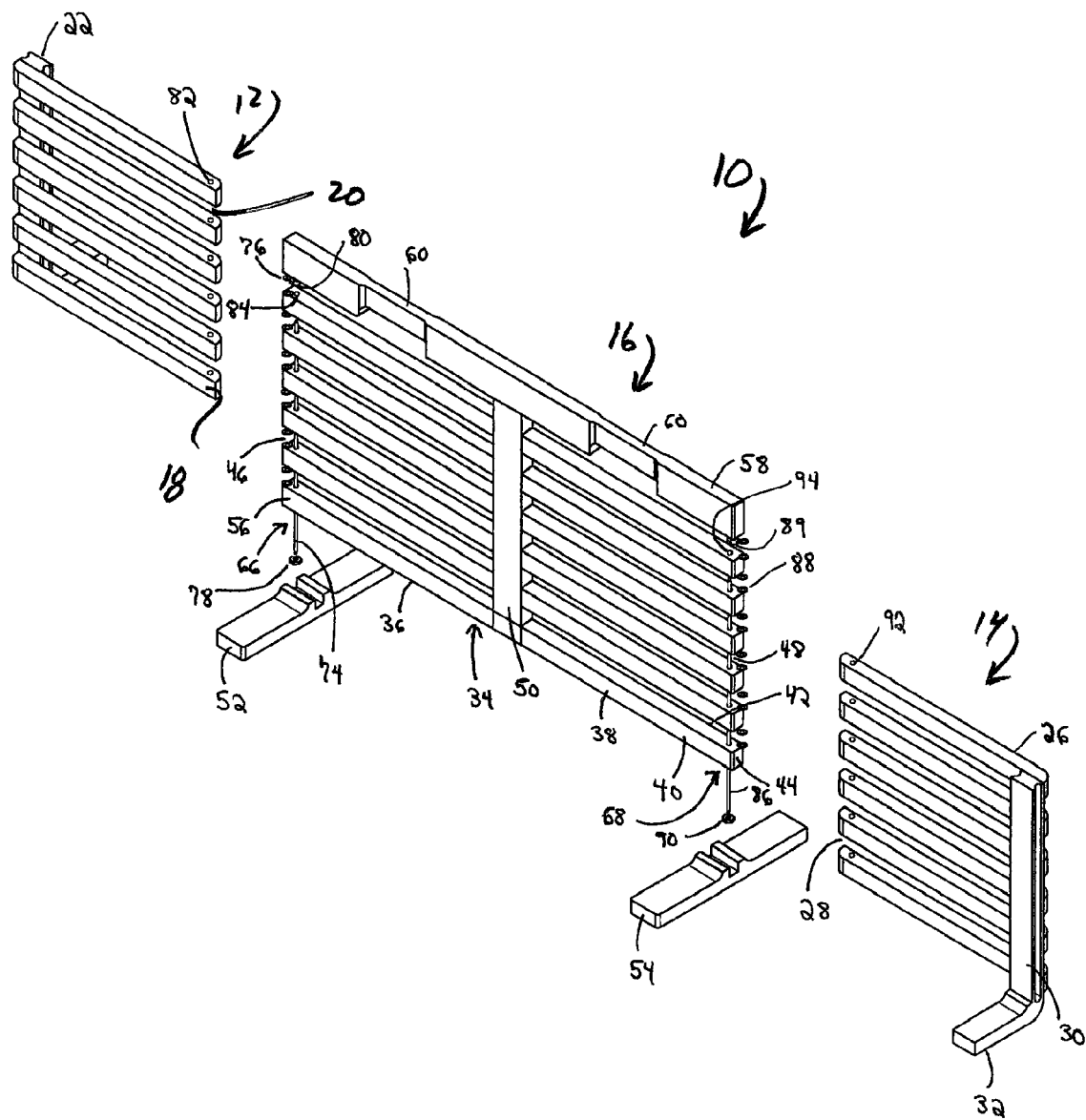
FIG. 5 is a perspective and exploded view of the reconfigurable gate of the present teachings.

With reference to FIG. 5, the reconfigurable gate 10 may further include a first hinge member 66 and a second hinge member 68. The first and second hinge members 66, 68 define a first pivot axis 70 and second pivot axis 72, respectively. The first hinge member 66 may include a substantially cylindrical first rod element 74, a first plurality of washers 76, a first nut member 78 and a second nut member 80. The first plurality of washers 76 is operable to receive the first rod element 74 The first and second nut members 78, 80 are operable to secure the first rod element 74 to the first section 12 and the third section 16 of the reconfigurable gate 10. The first cross members 18 may include a plurality of first cross member apertures 82. The first plurality of third cross members 36 may include a first plurality of third cross member apertures 84. The first cross member apertures 82 and the first plurality of third cross member apertures 84 may be operable to receive the first rod element 74 and to rotate thereon. The first plurality of washers 76 may be interposed between the first cross members 18 and the first plurality of third cross members 36, concentric to the first rod element 74, the first cross member apertures 82 and the first plurality of third cross member apertures 84.

The second hinge member 68 may be generally identical to the first hinge member 66. In this regard, the second hinge member 68 may include a substantially cylindrical second rod element 86, a second plurality of washers 88, a third nut member 89 and a fourth nut member 90. The second plurality of washers 88 is operable to receive the second rod element 86. The third and fourth nut members 89, 90 are operable to secure the second hinge member 68 to the second section 14 and the third section 16 of the reconfigurable gate 10. The second cross members 26 may include a plurality of second cross member apertures 92. The second plurality of third cross members 38 may include a second plurality of third cross member apertures 94. The second cross member apertures 92 and the second plurality of third cross member apertures 94 may be operable to receive the second rod element 86 and to rotate thereon. The second plurality of washers 88 may be interposed between the second cross members 26 and the second plurality of third cross members 38, concentric to the second rod element 86, the second cross member apertures 92 and the second plurality of third cross member apertures 94.

Figure 6:
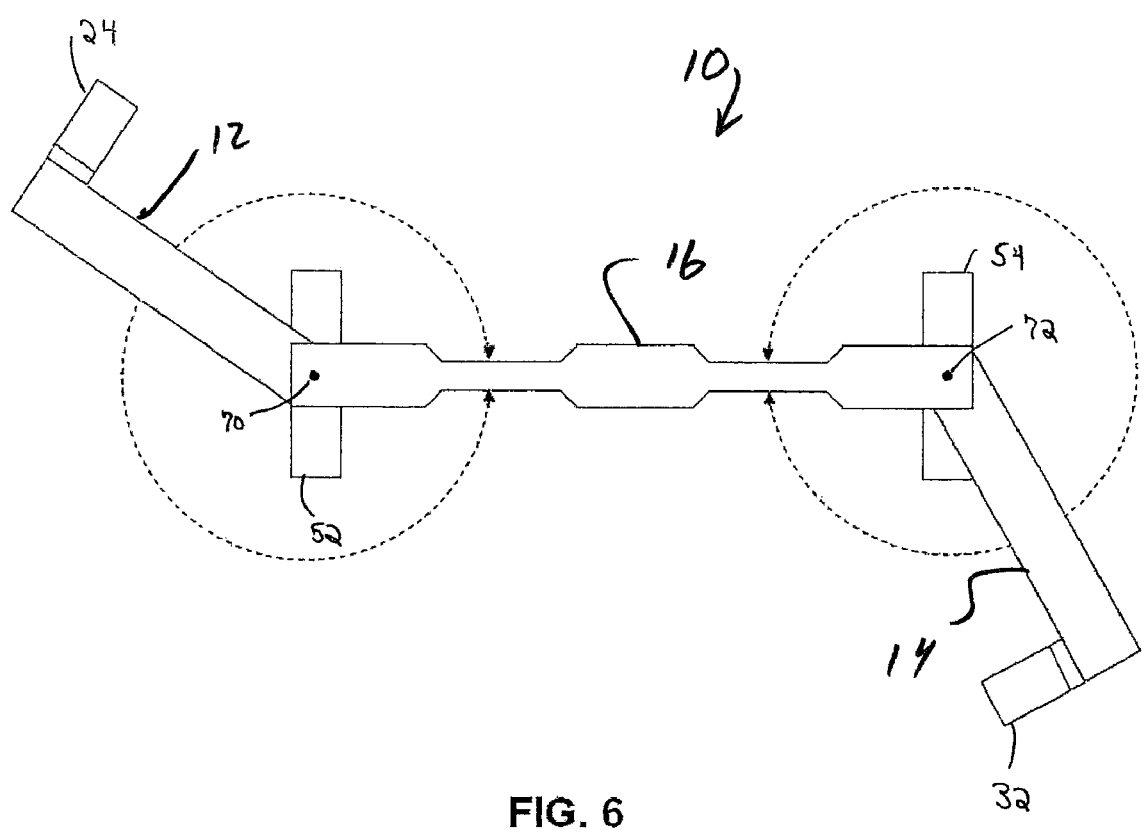
FIG. 6 is a schematic top view illustrating a range of articulation for the reconfigurable gate of the present teachings.

With particular reference to FIG. 6, the first section 12 is rotatable relative to the third section 16 through an angle of about 180 degrees or more. In the particular embodiment illustrated, the first section 12 is rotatable relative to the third section 16 through an angle substantially equal to 360 degrees about the first pivot axis 70 on the first hinge member 66. The first plurality of openings 46 in the third section 16 is operable to receive the plurality of first cross members 18 of the first section 12. As best seen in FIG. 3, in the collapsed configuration the plurality of first cross members 18 are substantially interleaved with the first plurality of third cross members 36, such that the first cross members 18 and the first plurality of third cross members 36 define a substantially planar and substantially solid first wall 96.

With reference to FIG. 6, the second section 14 is rotatable relative to the third section 16 through an angle of about 180 degrees or more. In the particular embodiment illustrated, the first section 12 is rotatable relative to the third section 16 through an angle substantially equal to 360 degrees about the second pivot axis 72 on the second hinge member 68. The second plurality of openings 48 in the third section 16 is operable to receive the plurality of second cross members 26 of the second section 14. As best seen in FIG. 2, in the collapsed configuration the plurality of second cross members 26 are substantially interleaved with the second plurality of third cross members 38, such that the second cross members 26 and the second plurality of third cross members 38 define a substantially planar and substantially solid second wall 98. From a collapsed configuration, illustrated in FIGS. 2 and 3, the first section 12 and the second section 14 are operable to rotate in the same direction relative to the first and second pivot axes 70, 72, respectively, by angles substantially equal to 360 degrees. Explaining further and as illustrated in the top schematic view of FIG. 6, both of the first and second sections 12 and 14 rotate counterclockwise about the pivot axes 70, 72, respectively, to their collapsed configurations.

It will be appreciated by those skilled in the art that the first and second hinge members 66, 68 can be a variety of structures well known in the art that are all operable to allow rotation of the first and second sections 12, 14 relative to the third section 16.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A reconfigurable gate comprising:
 a first fence section including a plurality of first cross members;
 a second fence section including a plurality of second cross members; and
 a third fence section between the first and second fence sections, the third fence section including a plurality of third cross members;
 wherein the first fence section and the second fence section are rotatably attached to the third fence section such that in a collapsed configuration of the reconfigurable gate the plurality of first cross members and the plurality of second cross members are both substantially interleaved with the plurality of third cross members along the entire lengths of the first and second pluralities of cross members such that the first, second and third pluralities of cross members are in a common plane.

2. The reconfigurable gate of claim 1, wherein the plurality of third cross members defines a first plurality of openings for receiving the plurality of first cross members in the collapsed configuration.

3. The reconfigurable gate of claim 2, wherein the plurality of third cross members further defines a second plurality of openings for receiving the plurality of second cross members in the collapsed configuration.

4. The reconfigurable gate of claim 1, wherein the plurality of first cross members, the plurality of second cross members, and the plurality of third cross members cooperate to form a substantially planar wall in the collapsed configuration.

5. The reconfigurable gate of claim 1, wherein at least one of the third cross members defines a handle section.

6. The reconfigurable gate of claim 5, wherein the at least one third cross member is a top cross member and the top cross member includes a reduced height portion forming the handle section.

7. The reconfigurable gate of claim 6, wherein the reduced height portion forms at least one aperture in the reconfigurable gate in the collapsed configuration.

8. The reconfigurable gate of claim 1, wherein the first fence section is rotatable relative to the third fence section about a first pivot axis and the second fence section is rotatable relative to the third fence section about a second pivot axis.

9. The reconfigurable gate of claim 1, wherein the first fence section is operable to rotate relative to the third fence section through an angle greater than 180 degrees, and the second fence section is operable to rotate relative to the third fence section through an angle greater than 180 degrees.

10. The reconfigurable gate of claim 1, wherein the first fence section is operable to rotate relative to the third fence section through an angle substantially equal to 360 degrees, and the second fence section is operable to rotate relative to the third fence section through an angle substantially equal to 360 degrees.

11. The reconfigurable gate of claim 1, wherein the plurality of third cross members include a first side wall, a second side wall, and an end wall, and the first side wall, the second side wall, and the end wall form an outermost border of a wall portion of the collapsible fence in said fully rotated configuration.

12. The reconfigurable gate of claim 1, wherein the reconfigurable gate is portable.

13. The reconfigurable gate of claim 1, wherein the reconfigurable gate is self-supporting.

14. The reconfigurable gate of claim 1, wherein the reconfigurable gate is a portable gate.

15. The reconfigurable gate of claim 14, wherein the first and second fence sections are rotatable relative to the third fence section through at least 180 degrees.

16. The reconfigurable gate of claim 14, wherein the first and second fence sections are rotatable relative to the third fence section through an angle substantially equal to 360 degrees.

17. A reconfigurable gate comprising:
 a generally planar central section defining a first plurality of horizontally extending openings and a second plurality of horizontally extending openings;
 a first end section coupled to the central section for rotation about a first pivot axis, the first end section defined by a first plurality of horizontally extending elements; and
 a second end section couples to the central section for rotation about a second pivot axis, the second end section defined by a second plurality of horizontally extending elements;
 wherein the first and second end sections are each rotatable relative to the central section between a collapsed configuration of the reconfigurable and an expanded configuration of the reconfigurable gate such that in the collapsed configuration the first plurality of horizontally extending elements is substantially disposed in the first plurality of openings and the second plurality of horizontally extending elements is substantially disposed in the second plurality of openings and further such that the first and second pluralities of horizontally extending elements are in a common plane.

18. The reconfigurable gate of claim 17, wherein the reconfigurable gate is substantially planar when the first and second end sections are in the collapsed configuration.

19. The reconfigurable gate of claim 17, wherein the reconfigurable gate is self-supporting.

20. The reconfigurable gate of claim 17, wherein the reconfigurable gate is portable.

* * * * *